United States Patent [19]

Smith et al.

[11] Patent Number: 5,704,021

[45] Date of Patent: Dec. 30, 1997

[54] ADAPTIVE COLOR RENDERING BY AN INKJET PRINTER BASED ON OBJECT TYPE

[75] Inventors: Thomas G. Smith, San Diego; Kirt Alan Winter; Frank Anthony Kurucz, both of Escondido, all of Calif.

[73] Assignee: Hewlett-Packard Company, Palo Alto, Calif.

[21] Appl. No.: 189,006

[22] Filed: Jan. 27, 1994

[51] Int. Cl.$^6$ .................. G06K 15/00; H04N 1/46; G03F 3/08

[52] U.S. Cl. .................. 395/109; 358/502; 358/504; 358/518; 358/538

[58] Field of Search .................. 395/109, 156, 395/112, 114, 110, 115–117; 358/298, 504, 527, 518, 456, 502, 450, 462, 467, 538, 534, 540, 530; 382/175, 176; 349/15, 14, 43

[56] References Cited

U.S. PATENT DOCUMENTS

| 4,214,276 | 7/1980 | Pugsley et al. | 358/256 |
|---|---|---|---|
| 4,724,431 | 2/1988 | Holtey et al. | 345/22 |
| 5,001,576 | 3/1991 | Tanaka et al. | 358/462 |
| 5,018,024 | 5/1991 | Tanioka | 358/462 |
| 5,081,596 | 1/1992 | Vincent et al. | 395/109 |
| 5,103,407 | 4/1992 | Gabor | 395/131 |
| 5,140,674 | 8/1992 | Anderson et al. | 895/112 |
| 5,157,507 | 10/1992 | Yamada | 358/462 |
| 5,254,978 | 10/1993 | Beretta | 395/131 |
| 5,257,097 | 10/1993 | Pineau et al. | 358/527 |
| 5,272,549 | 12/1993 | McDonald | 358/527 |
| 5,278,678 | 1/1994 | Harrington | 358/518 |
| 5,311,212 | 5/1994 | Beretta | 395/150 |
| 5,313,291 | 5/1994 | Appel et al. | 358/504 |
| 5,327,265 | 7/1994 | McDonald | 358/527 |
| 5,334,992 | 8/1994 | Rochat et al. | 345/22 |
| 5,371,844 | 12/1994 | Andrew et al. | 395/155 |
| 5,579,446 | 11/1996 | Naik et al. | 395/109 |

FOREIGN PATENT DOCUMENTS

| 0464650 | 8/1980 | European Pat. Off. |
| 2117208 | 5/1983 | United Kingdom . |
| 2133657 | 7/1984 | United Kingdom . |

Primary Examiner—Dwayne Bost
Assistant Examiner—Tracy M. Legree
Attorney, Agent, or Firm—David S. Romney

[57] ABSTRACT

A method of using a printer system for identifying one or more different types of color objects in a document, selecting a preferred rendering option such as halftoning and/or color matching for each one of such different color object types, respectively, and then printing the document in accordance with the rendering options selected for each of such different color object types. In a printing system such as an inkjet color printer coupled through a printer driver to a host computer, a default halftoning technique and a default color-matching map are incorporated into the printer system for automatic invocation whenever a particular color object type is printed.

19 Claims, 14 Drawing Sheets

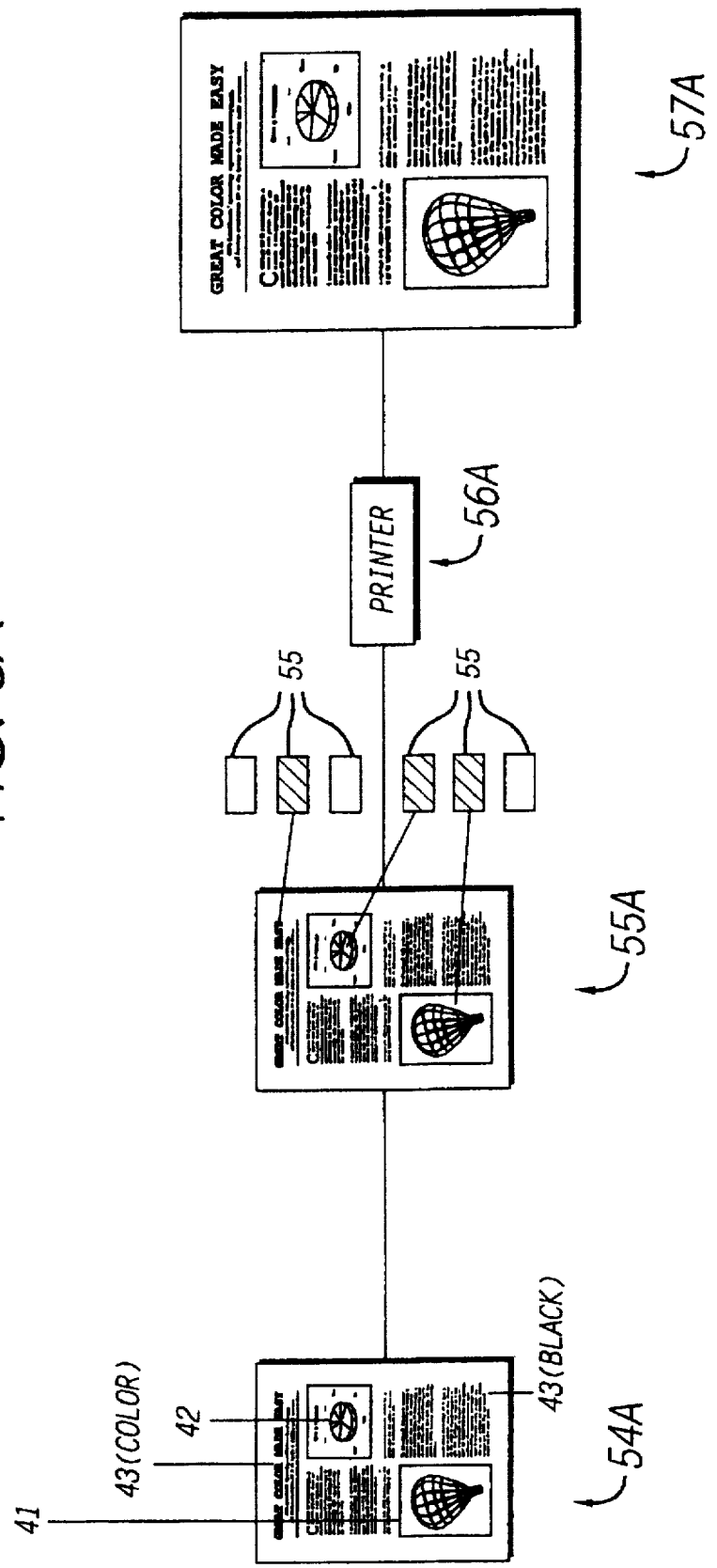

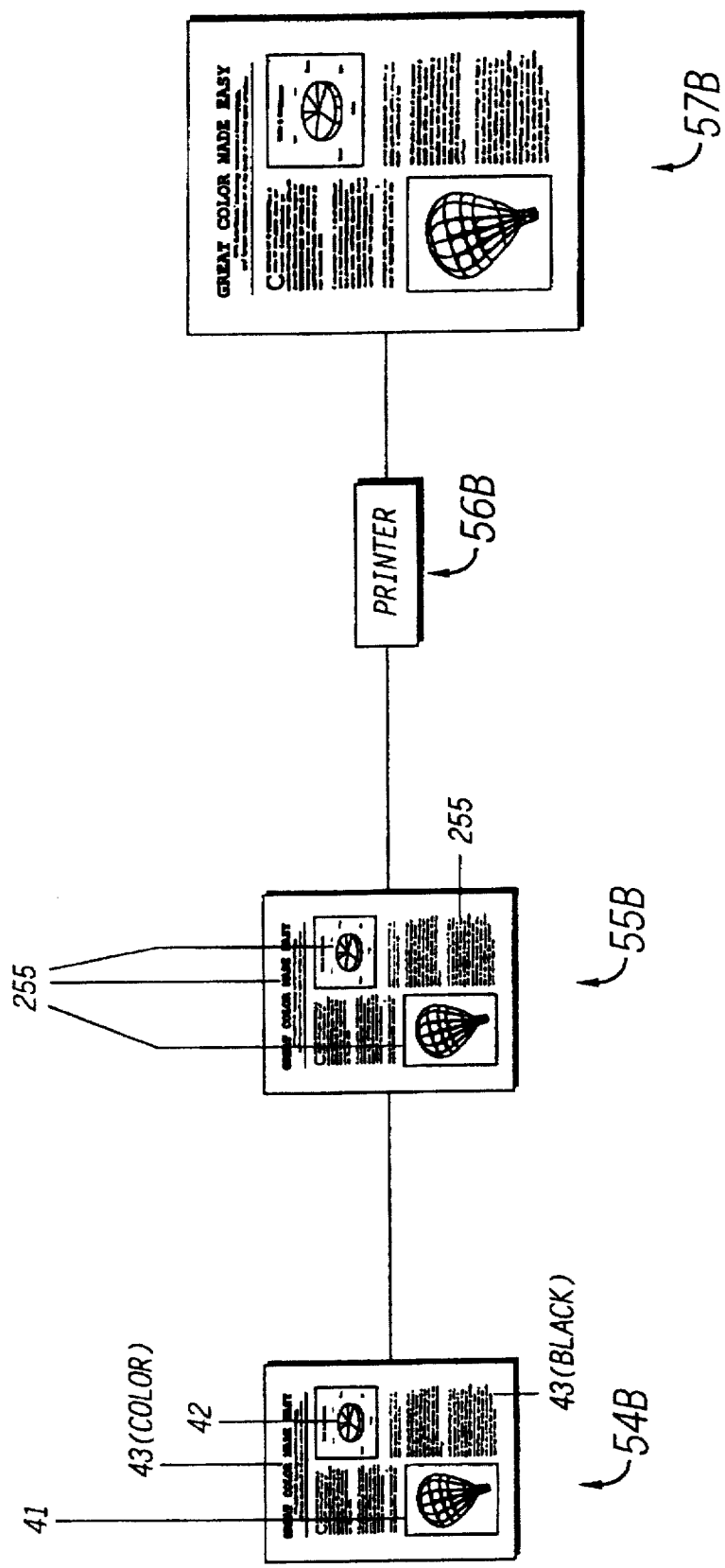

ADAPTIVE COLOR RENDERING BY AN INKJET PRINTER BASED ON OBJECT TYPE

RELATED APPLICATIONS

These related applications, assigned to the assignee of the present application, are incorporated here by reference in their entirety Filed concurrently herewith: Ser. No. 08/187,933, entitled "COLOR HALFTONING OPTIONS INFLUENCED BY PRINT-MODE SETTING", in the names of Kirt A. Winter et al.; Ser. No. 08/187,942, entitled "MANUAL/ AUTOMATIC USER OPTION FOR COLOR PRINTING OF DIFFERENT TYPES OF OBJECTS", in the names of Sachin S. Naik, et al.; Ser. No. 08/187,935 titled "COLOR DIGITAL HALFTONING USING BLACK AND SECONDARY COLOR REPLACEMENT", in the names of Alexander Perureal, Jr., et al. and now replaced by file-wrapper continuing application Ser. No. 08/438,294 filed May 10, 1995; Ser. No. 08/189,541 titled "COLOR DIGITAL HALFTONING USING BLACK AND SECONDARY COLOR REPLACEMENT AND COLOR VECTOR DITHERING" in the names of Alexander Perumal, Jr., et al.; Ser. No. 08/187,567, entitled "BI-LEVEL DIGITAL COLOR PRINTER SYSTEM EXHIBITING IMPROVED UNDER-COLOR REMOVAL AND ERROR DIFFUSION PROCEDES", in the names of Gary Dispoto, et al.; and Ser. No. 08/188,618, entitled "AUTOMATED OPTIMIZATION OF HARDCOPY OUTPUT", in the names of Steven O. Miller, et al.; and further Earlier-filed and copending herewith: Ser. No. 08/057,244, entitled "HALFTONE IMAGES USING PRINTED SYMBOLS MODELLING", filed May 3, 1993, in the name of Qian Lin; and Ser. No. 08/060,285, entitled "HALFTONE IMAGES USING SPECIAL FILTERS", filed May 11, 1993, in the name of Qian Lin.

BACKGROUND

1. Field of the Invention

This invention relates generally to color printing; and more particularly to printing different types of color objects (or so-called "copy") in a common printout.

2. Related Art

The use of color monitors for computers has accelerated the need for color printers which can produce a satisfactory printout of what is displayed on the screen. With such equipment, determining what constitutes a "satisfactory" color printout is often quite problematic.

Part of this problem arises from the subjective nature of color. Color is a sensation produced by the combined effects of light, objects and human vision. A particular color or combination of colors may be appealing to one person while at the same time being offensive to another.

Another part of the "satisfactory"-color definitional problem arises from the different color technologies used in computer monitors and color printers. For example, computer monitors are based on a color gamut of red, green and blue pixels (RGB) whereas color printers such as inkjet printers are typically based on a color gamut of cyan, magenta, yellow and black (CMYK). The RGB color components of computer monitors are combined together in an "additive" way by mixing red, green and blue light rays to form a first variety of different colors; but the CMYK components of color inks are applied to media in different combinations in a "subtractive" way to form a second variety of different colors.

Various different color-management techniques have been used to provide some form of matching between, for instance, the colors viewed on a computer monitor and the colors printed by a specific printer using a given ink formula on a particular type of printing medium. Such color-management techniques have also employed different types of halftoning algorithms (in this art commonly called "rendition" or sometimes "rendering") to improve appearance of color printout of various types of objects (or in traditional publications jargon "copy").

Desktop publishing software has created an additional dimension of the satisfactory-color-definition problem by printing together, in a composite document, objects (or "copy") of different types. Such types include photos and photograph-like images, business graphics (e.g., charts and logos), and scalable text in both color and black.

On one hand, by skewing the printer color output to ensure satisfactory color printing of photos, color-management systems often cause the business graphics in the same document to appear washed out and lose their impact. On the other hand, by skewing the color output to ensure satisfactory color printing of saturated vivid colors for business graphics, color systems can cause a photo in the same document to lose its lifelike appearance.

Some parts of the aforementioned color printing problem have been partially solved by providing manually controlled printer settings to optimize results. In addition, sophisticated users who demand exact color matching from screen to printout can obtain some solutions by customizing object specifications before incorporation into a document—using color-management software integrated into computer operating systems, as well as color-management software supplied as third-party software applications.

Also, some color-matching technology has been incorporated into printer drivers. A driver provides a translation interface from a particular computer operating system, and/ or application software running in the computer, to a color printer which acts as a hardcopy output device.

These modern developments, however, have only exacerbated the satisfactory-color problem for another group of users. Those are users who haven't time or interest for making multiple manual selections, or haven't sophistication for setting up exact desired on-screen color for matching by a printout.

There is thus a need for a refined color-management technology which somehow accommodates users of a wide variety of commitment, interest and abilities. Such technology must at the same time overcome the inconsistent color requirements, within a single composite document, of different types of objects or "copy" such as photo images, business graphics, color text, and black text.

As can now be seen, important aspects of the technology which is used in the field of the invention are amenable to useful refinement.

SUMMARY OF THE DISCLOSURE

The present invention introduces such refinement. It allows for either automatic or customized settings respecting color correction as well as halftoning.

Before offering a relatively rigorous discussion of the present invention, some informal orientation will be provided here. It is to be understood that these first comments are not intended as a statement of the invention.

The invention offers a method of using a printer system to identify one or more different types of color objects in a document—selecting a preferred rendering option, such as halftoning, and/or selecting a preferred color-control scheme, such as color-matching—for each one of such different color-object types, respectively, and then printing the document in accordance with the options selected for each of such different object types. In preferred forms of the invention, all raster data commands are rendered as natural images, all text commands are rendered as text, and all other commands are rendered as business graphics.

The invention typically is practiced in the context of a printing system such as an inkjet color printer coupled through a printer driver to applications (or operating-system) software running in a host computer. The invention incorporates a default halftoning technique and a default color matching map into such a printing system, for automatic invocation whenever an object of a particular color-object type is printed.

Now with these preliminary observations in mind this discussion will proceed to a perhaps more-formal summary. The present invention has more than one main aspect or facet; these primary facets or aspects are amenable to use independently of one another, although for optimum enjoyment of all the benefits of the invention they are preferably practiced in conjunction together.

In preferred embodiments of a first of these main facets, the present invention is a method of color inkjet printing for use in printing color objects of any of a plurality of different object types. This method includes the step of providing some means for identification and recognition of a plurality of different types of color objects.

It also includes the steps of providing some means for using a plurality of different color-rendering options in printing color objects; and identifying the type of at least one color object in a document to be printed. Another included step is selecting a preferred color-rendering option to be used for objects of that identified type.

In addition the method of preferred embodiments of this first main aspect of the invention includes the step of employing a printer system to cause a color inkjet printer to use the preferred color-rendering option selected in the selecting step. The printer is thereby caused to print the at least one color object, of the identified type, in the document.

The foregoing may be a description or definition of the first primary aspect of the present invention in its broadest or most general terms.

In preferred embodiments of a second of the main aspects of the invention, the invention is a method of printing a composite document having therein color objects of different color-object types. This method includes the step of identifying the type of at least one color object.

Other steps of this method are: using a predetermined first rendering option to print all color objects of the one color-object type of the identifying step; and employing a predetermined second rendering option to print color objects of remaining types, different from the one color-object type.

The above may be a definition or description of the second main facet of the invention in its most general or broadest terms.

In preferred embodiments of a third of the primary facets of the invention, the invention is a system of printing color documents in a raster printer. This system includes a printer for applying color to media (i.e. to a piece of printing medium such as paper), and a document source to provide specifications for a composite color document having nontext color objects.

A preferred embodiment of this third main aspect of the invention further includes a printer system connected through a printer driver to the document source. The printer system in turn includes color-management means for providing print-rendering options which are selectively enabled for the nontext color objects.

The foregoing may be a description or definition of the third primary aspect of the present invention in its broadest or most general terms. Even with each of the three main facets of the invention as above-presented in general or broad forms, however, as can now be seen each of these three aspects of the invention makes important contribution to resolving the previously outlined problems of the prior art.

In particular each aspect of the invention, by in some way using information about object type to control the rendition to be used in printout, greatly simplifies and reduces the color-management-setting decision-making demands on sophisticated human operators. That is to say, the operator's work load is reduced to making halftoning decisions for each object type rather than each object.

This reduction is for each type ordinarily by a factor equal to the number of objects of that type—a number perhaps between one and a thousand, but in a typical or representative desktop-publishing document most commonly may amount to a factor of around five or ten. This is surely an extremely useful aid.

The second main aspect of the invention addresses or emphasizes performance of this type-to-rendition selection/printing process separately and independently for more than a single object type, which is to say at least two types. The third primary facet of the invention emphasizes or addresses the enabling of print-rendering options for color objects other than text; it is these objects whose manual management, according to the prior art, particularly challenge and burden the user.

Although preferred embodiments of the invention in each of its major aspects thus provide very significant advances relative to the prior art, nevertheless for greatest enjoyment of the benefits of the invention it is preferably practiced in conjunction with certain other features or characteristics which enhance its benefits.

For example, as mentioned earlier it is preferred that all three of these principal facets of the invention be practiced in conjunction with one another. In addition we prefer that the identifying step include identifying the types of color objects which are of at least three different types, in a document to be printed; and that the selecting step include selecting a preferred color-rendering option to be used for each of the at least three different color-object types.

In one preferred embodiment it is also desirable that the identifying and selecting steps both be accomplished automatically by the printer system. In another preferred embodiment, however, the selecting step is preferably reserved to the human operator.

We prefer to implement the identifying step by including in that step, as a criterion, identifying of all raster data commands as photo image color objects. In other words, the system preferably interprets presence of a raster data command as characteristic of a photograph or photograph-like color object—thus avoiding any need for embedment of a separate photo-identification code in the data, or for the operator to identify each photo or the like for the system.

Similarly we prefer that the system in the identifying step identify all text commands as text objects. For instance a command to use a particular font, or justification, or leading, serves as an identifying criterion for text—again without need for a separate text-identification code or for operator action.

It is also preferred that the identifying step include identifying all commands which are not text or raster-data commands as business graphics color objects. Graphics commands are less standardized or universal in format than those for text and raster data; hence, thus operating by a process of elimination has been found to very effectively identify graphics.

All of the foregoing operational principles and advantages, and others, of the present invention will be more fully appreciated upon consideration of the following detailed description, with reference to the appended drawings, of which:

BRIEF DESCRIPTION OF THE DRAWINGS

FIGS. 2 and 3 are a flow chart showing how the automatic and manual options of FIG. 1 are used to produce a color printout of a composite document;

DETAILED DESCRIPTION OF THE PREFERRED EMBODIMENTS

Figure 2A:
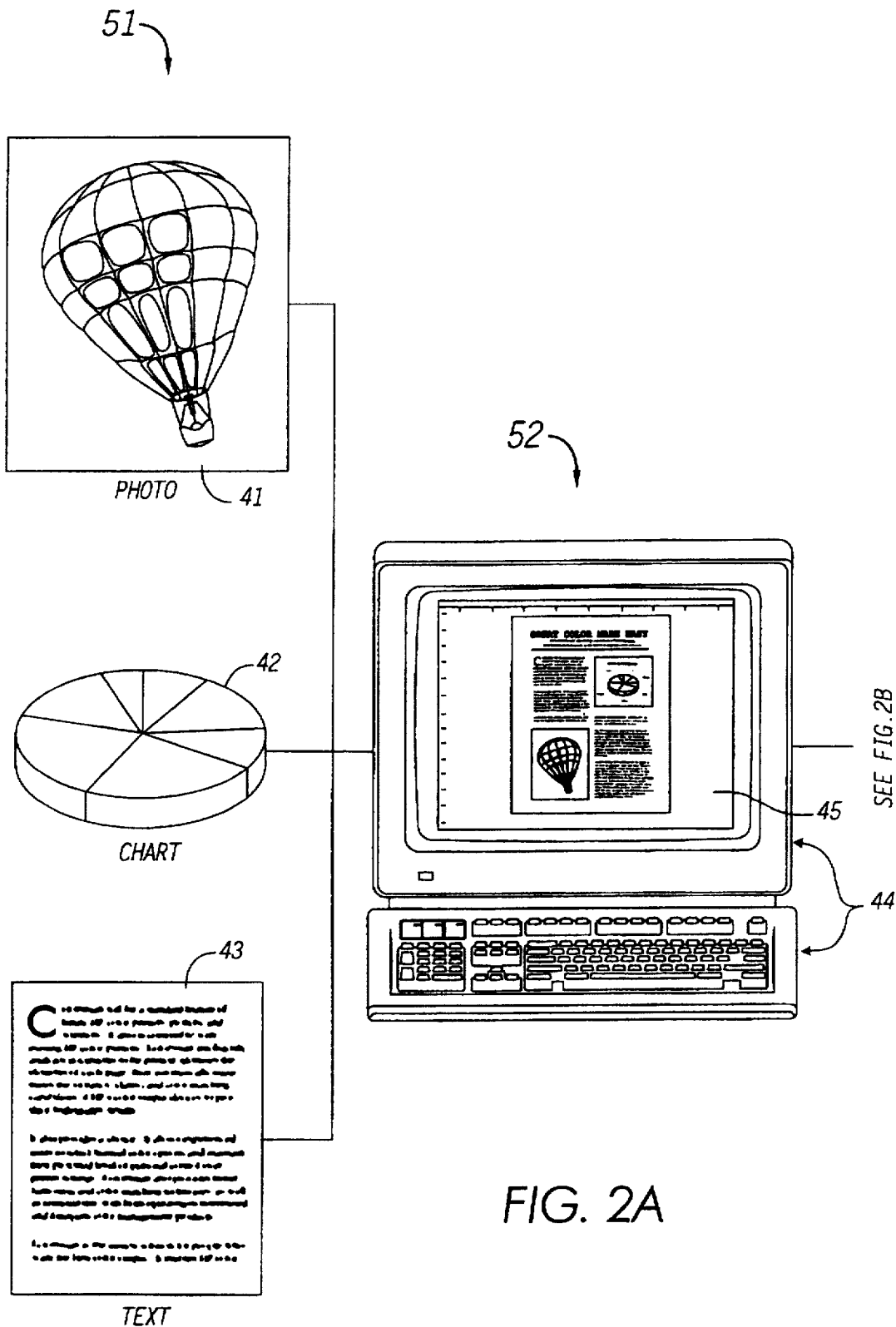
Figure 2B:
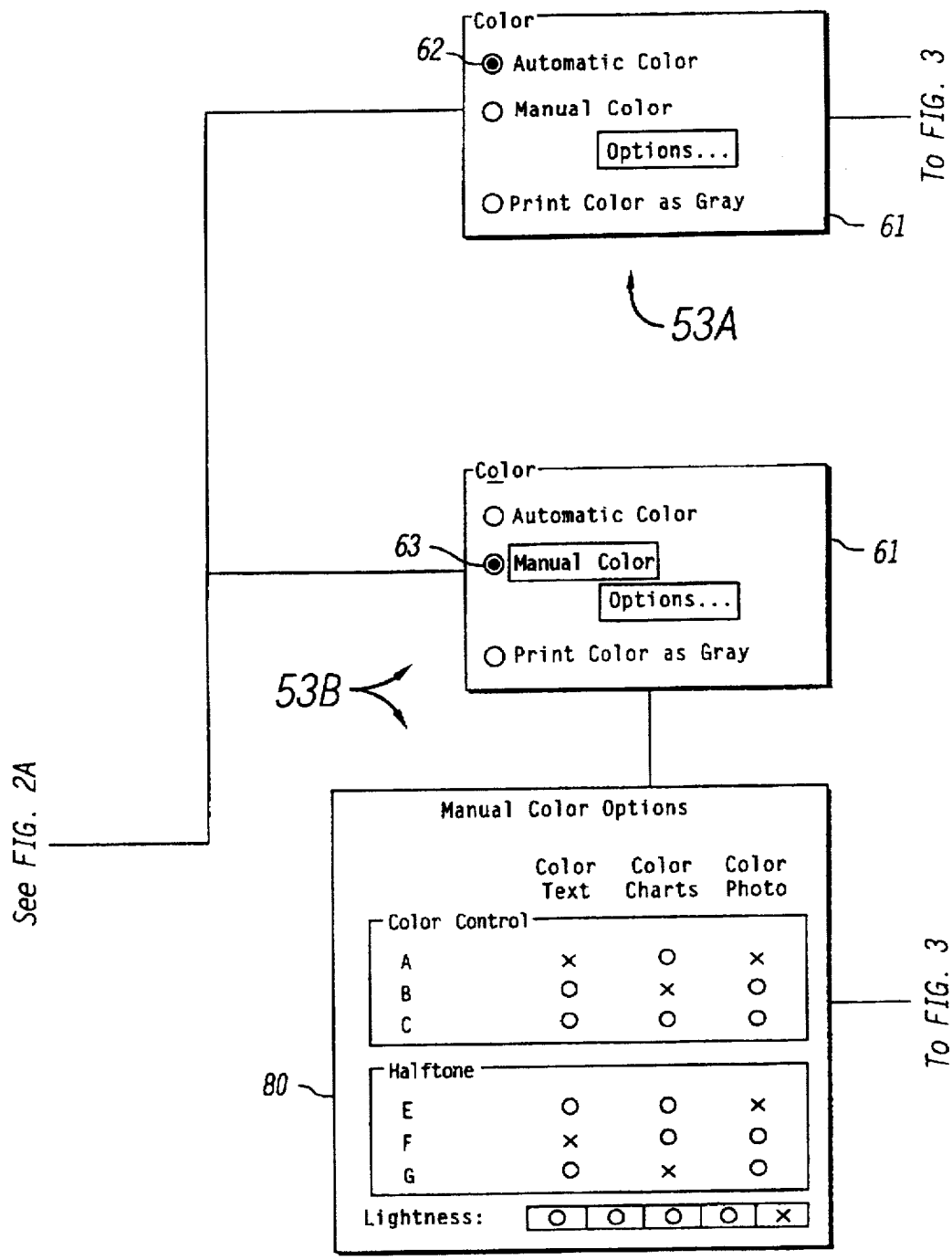

Generally speaking, the invention provides improved print quality for composite documents which have different types of objects to be printed in the same document and in many instances on the same page. In an exemplary printer system as illustrated in the drawings, one or more different types of color objects 41–43 (FIG. 2) are identified and flagged 54 (FIG. 3); a preferred rendering option, such as halftoning, and/or color matching is selected for each one of such different color-object types; and then the document is printed in accordance with the rendering and color-control options selected for each of such different color-object types.

Figure 1:
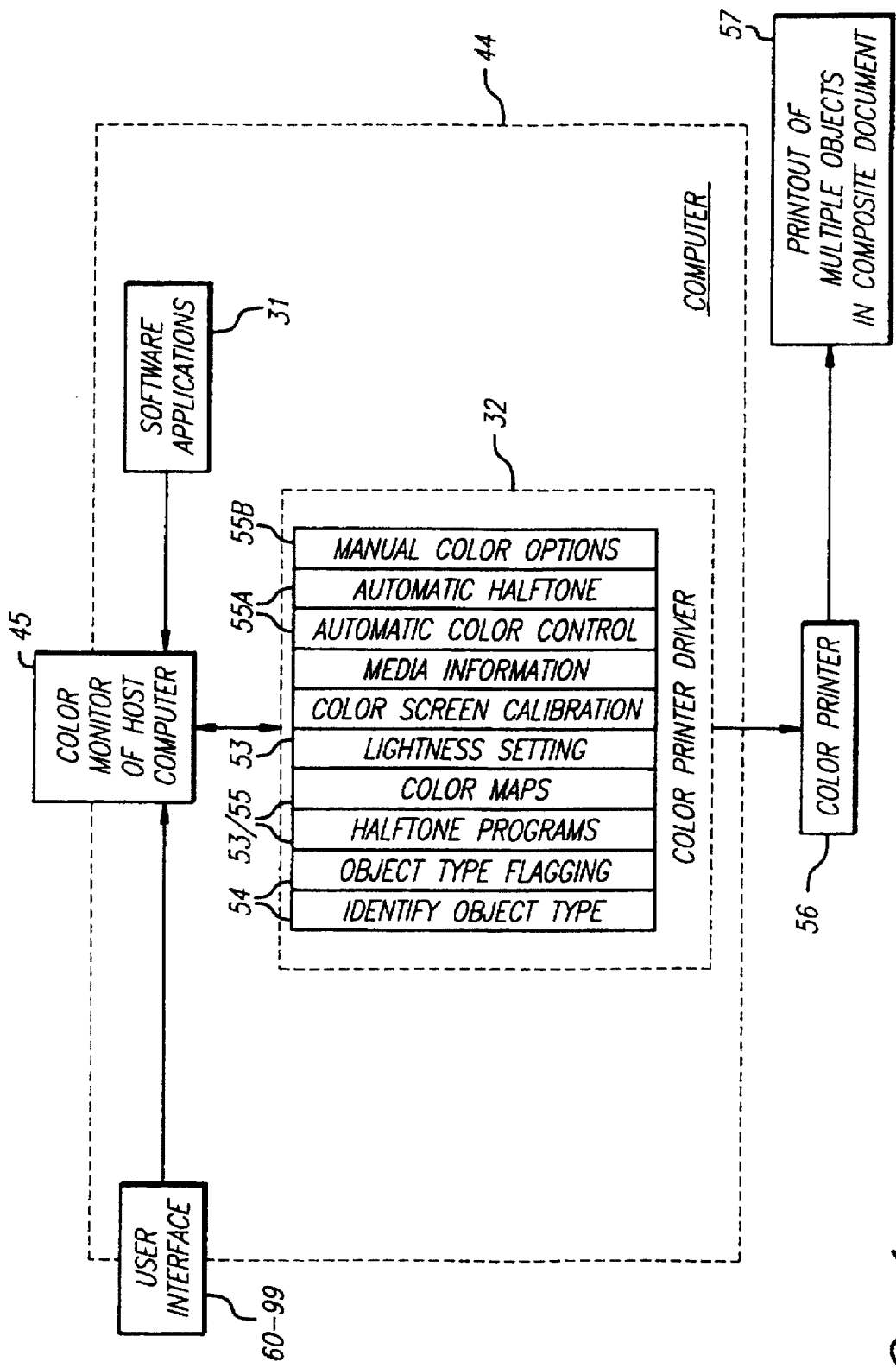
FIG. 1 is a block diagram showing a computer system employing a now-preferred embodiment of the invention.

The color inkjet system of the preferred embodiment includes a printer 56 (FIGS. 1 and 3) coupled through a printer driver 32 to applications (or operating-system) software 31 running in a host computer 44. A set of default halftoning techniques and default color-matching maps is incorporated in the printer system for automatic invocation whenever objects of respective particular color-object types are to be printed in the absence of user selections.

The invention has features which provide either automatic or manual implementation of various color-control and rendering options. For example, in the color inkjet system shown an interactive user interface allows a choice between one-"button" 62 automatic control 53A of color output or multibutton control 63–99 of color output, with both automatic and manual options providing independent control for color halftoning 90 and for color correction 81 based on the types of objects to be printed. The preferred form allows separate print-control options for text 43/85, graphics 42/86 and photo (or photograph-like) images 41/87.

Different print-quality modes 65 in the printer invoke 11, 12 different print-rendering options 21, 22 for a particular object to be printed. In the exemplary embodiment, a printer control 65 automatically invokes an error-diffusion halftoning technique 22 for photo images 41 whenever a high-quality mode 66 is designated, and automatically invokes a dither halftoning technique 21 for photo images 41 whenever a normal 67 or fast 68 print mode is designated.

It is important to note that the location of the color-management functionality is somewhat flexible within the printer system. Such functionality in the presently preferred version of the invention is primarily in the printer driver 32, but it could be implemented in the printer driver and/or printer 56 firmware—and/or even in the printer 56 hardware (e.g., custom integrated circuits, etc.).

Figure 11:
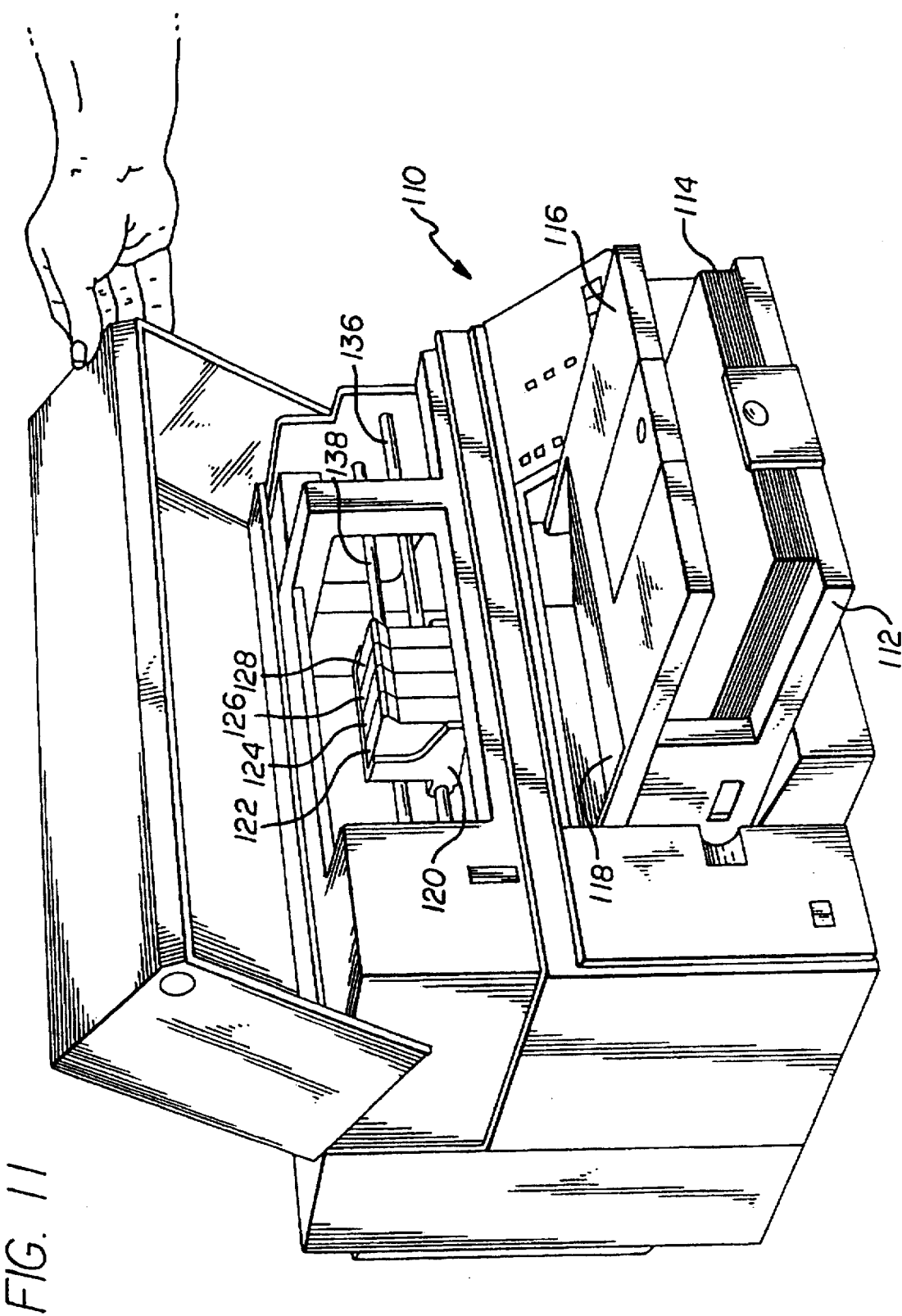
FIGS. 11 and 12 show a typical color inkjet printer for incorporating the color printout features of the present invention.

The preferred embodiment of the invention is used in an inkjet printer of the type shown in FIG. 11. In particular, inkjet printer 110 includes an input tray 112 containing sheets of a printing medium 114, which pass through a print zone and are fed past an exit 118 into an output tray 116.

Figure 12:
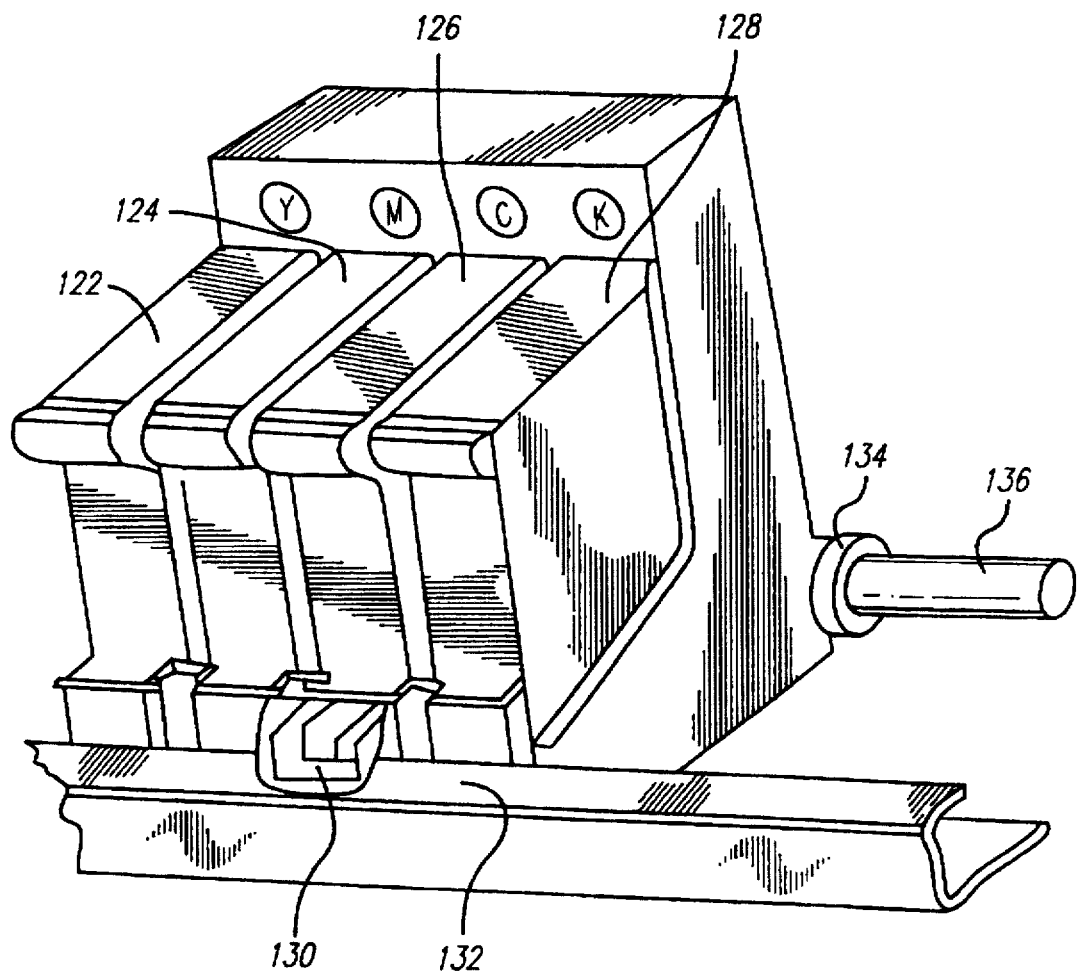

As seen in FIGS. 11 and 12, a movable carriage 120 holds print cartridges 122, 124, 126 and 128—which in turn respectively hold yellow (Y), magenta (M), cyan (C) and black (K) inks. The front of the carriage has a support bumper 130, which rides along a guide 132; while the back of the carriage has multiple bushings such as 134, which ride along a slide rod 136.

The position of the carriage as it travels back and forth across the medium is determined from an encoder strip 138. This position information is used to selectively fire the various ink nozzles on each print cartridge at the appropriate times during each carriage scan.

The preferred embodiment makes use of and performs in the environment of well-known commercially available color-matching specifications and operating-system software whose use is very widespread. These are respectively Pantone® Color and Microsoft's Windows® 3.1; the following details accordingly, for definiteness, are couched in terms of these familiar modules. The role of Pantone in this environment is, in essence, as arbiter of what may be called "true" color; however, those skilled in the field will understand that even this represents simply an effort to provide a reliably expert evaluation of what is inherently subjective.

The preferred embodiment further has been embodied in color printing devices 56,110 commercially available from the Hewlett Packard Company as its DeskJet® model 1200C and PaintJet® model XL300. We will sometimes in this document refer to these devices in abbreviated form as the DJ 1200C and PJ XL300 respectively.

Readers skilled in the art, however, will appreciate that the present invention is not limited to this environment. Rather, on the contrary, the invention both in principle and in practice has much broader applicability for use in any of a great variety of present and future color-matching/ operating-system/printer environments.

Figure 4:
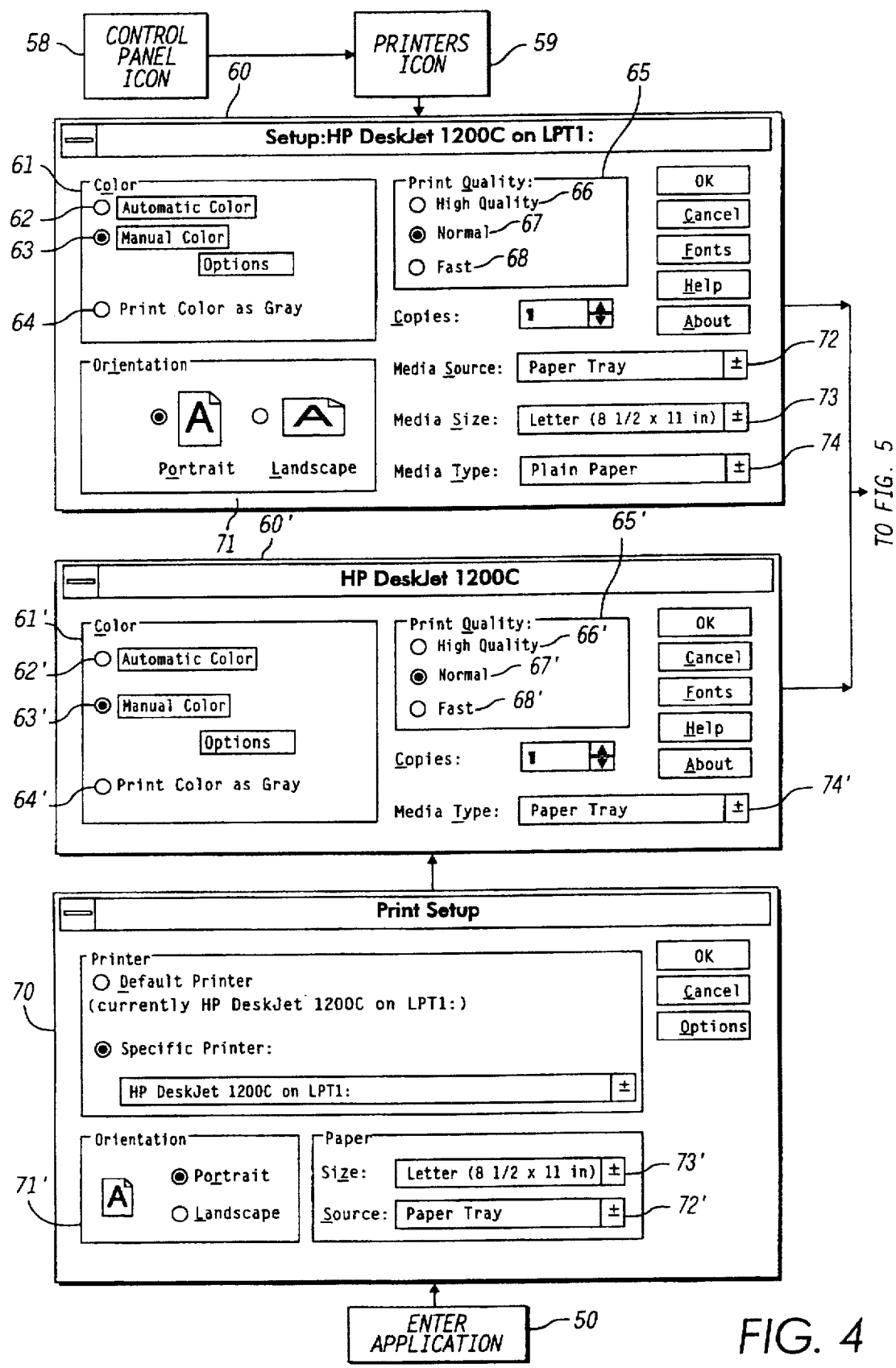
FIGS. 4 and 5 show a sequence of interactive computer screens available to a user who proceeds through the flow chart of FIGS. 2 and 3.

In Windows® 3.1, Microsoft developed the concept of a so-called "common print dialog" 70 (FIG. 4). This "dialog" screen is called from different points within the application or from Windows directly. When this dialog function 70 has been used, some features of the color-printing-driver 32 "Setup Dialog" screen 60 have been addressed already: these features are "Orientation" 71, "Media Size" (e.g., paper size) 73 and "Media Source" (e.g., paper source) 72.

These features therefore need not be presented to the user again in the print-driver 32 "Setup Dialog". With this in mind, the driver is best configured to display only a modified version 60' of the Setup Dialog 60 when the driver 32 is called from the common print dialog 70.

Figure 5:
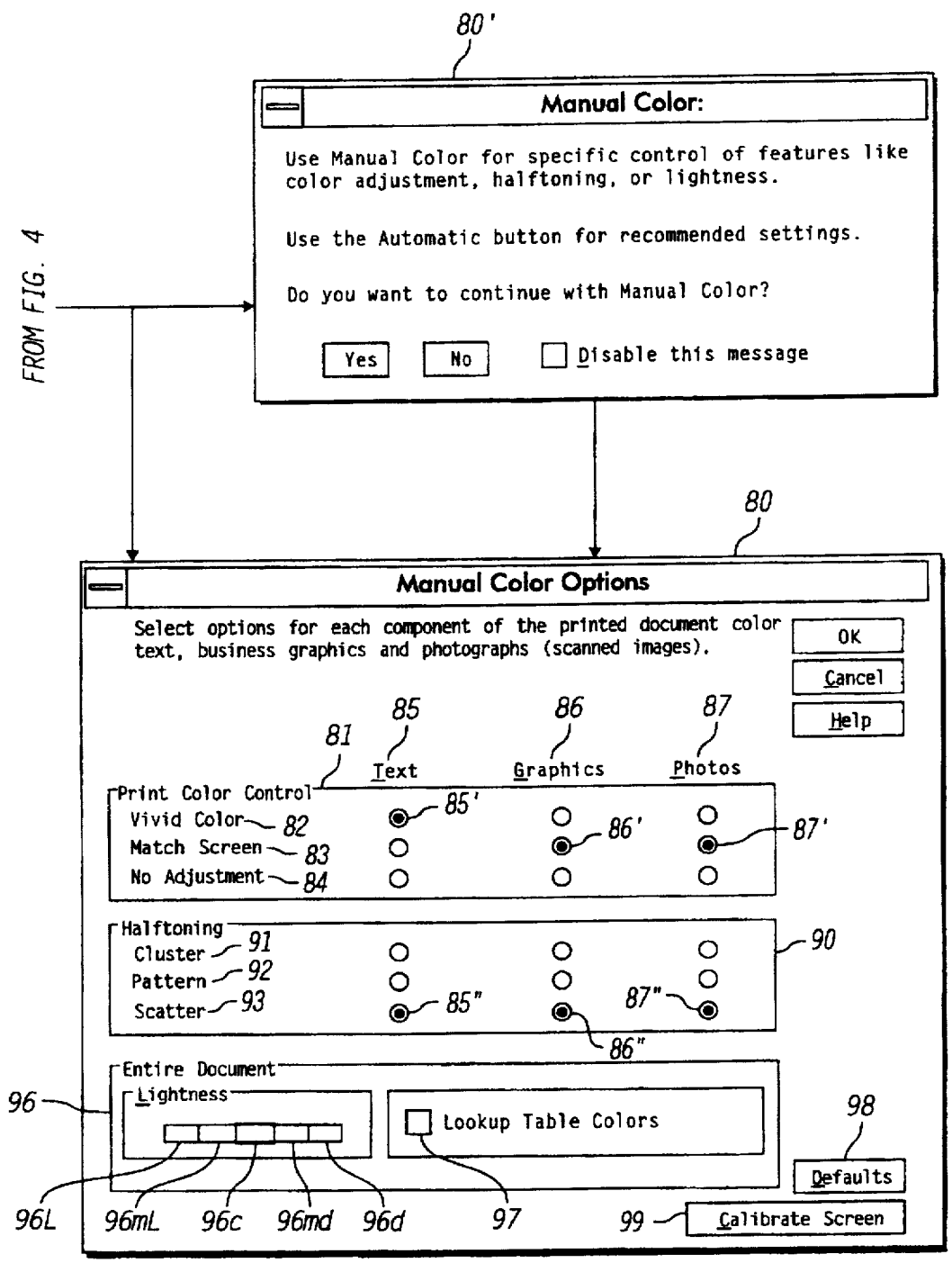
Figure 6:
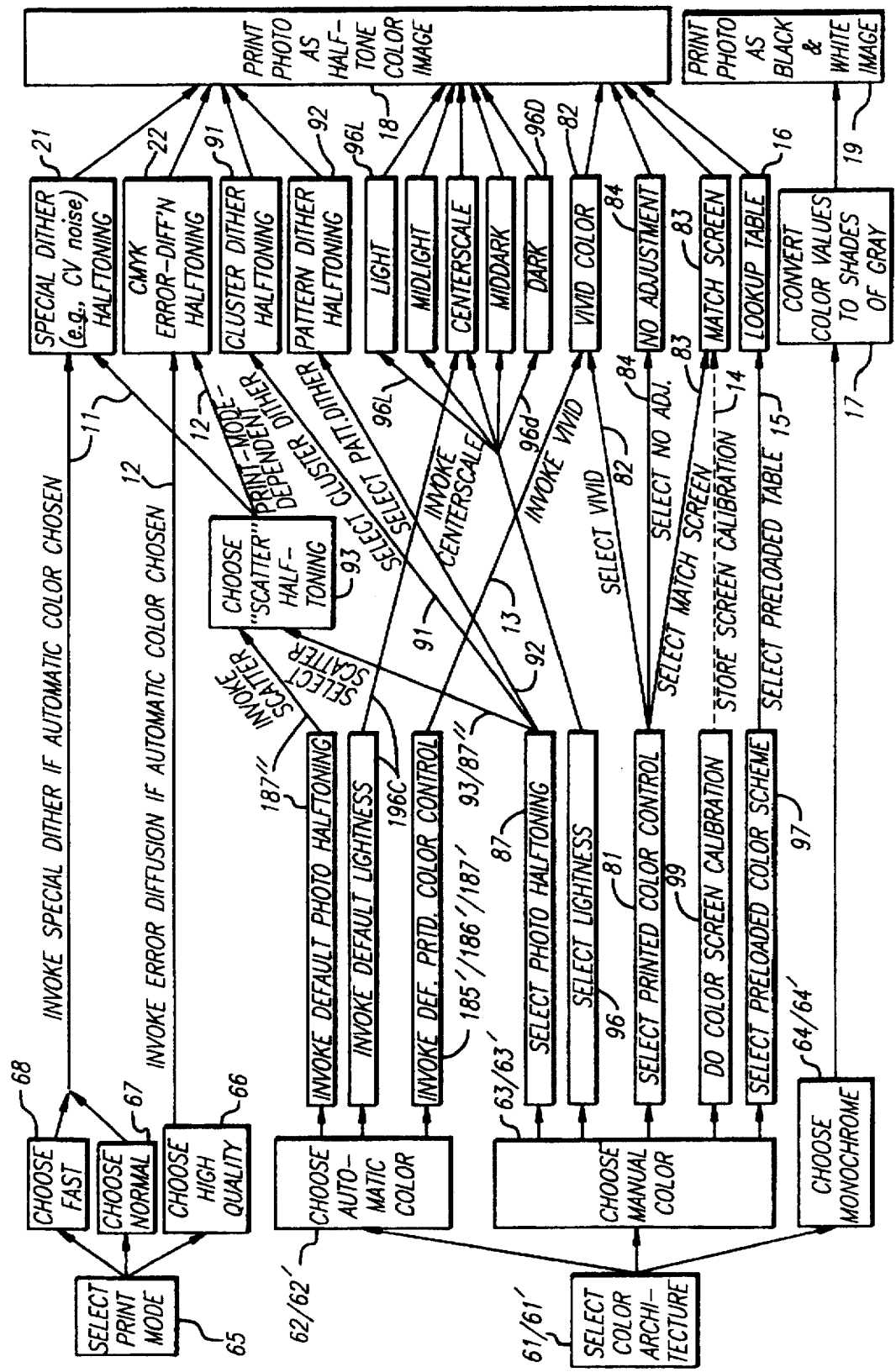
FIG. 6 is a schematic block diagram—particularly emphasizing the flow of user options or choices—of a system for producing printouts of color photographs, and other photograph-like objects, in accordance with the preferred embodiment of FIG. 1.
Figure 7:
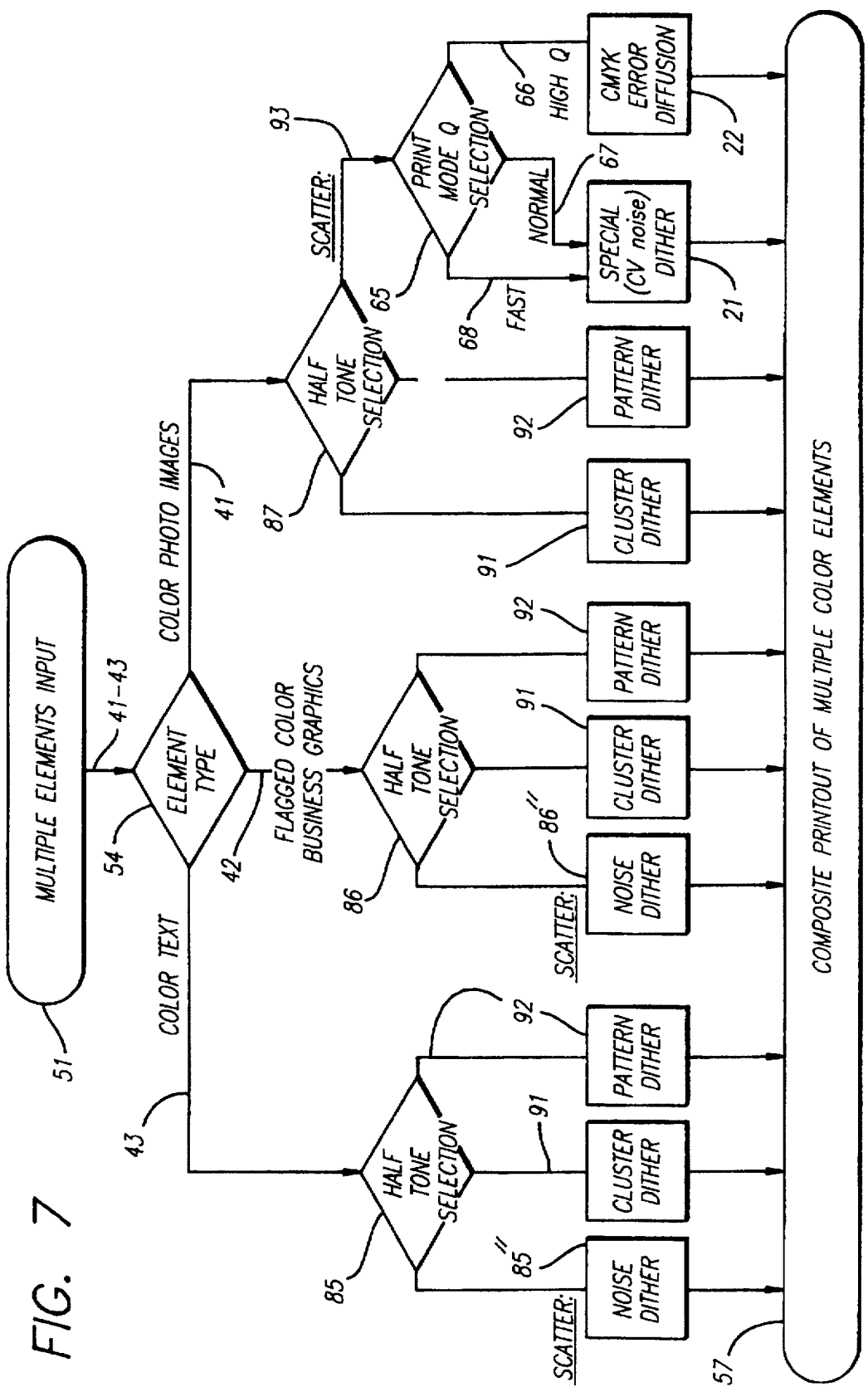
FIG. 7 is a halftoning flow chart for the same embodiment but particularly emphasizing the selection processes or sequence within the equipment.
Figure 8:
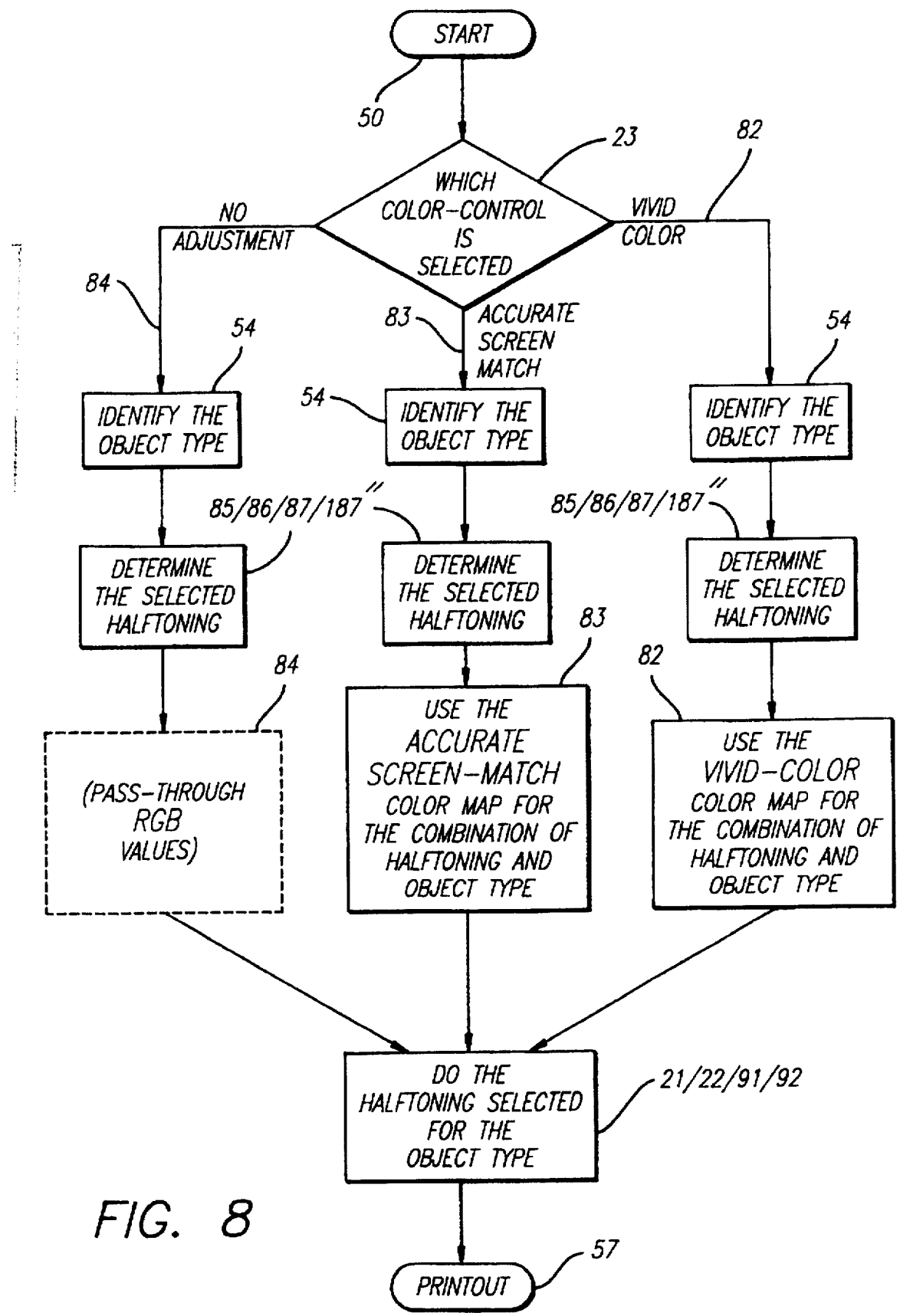
FIG. 8 is a color control flow chart for the same embodiment.

As shown in FIG. 5, the user options presented in the driver's "Manual Color Options" screen 80 are divided into two categories. The first category 81-93 contains the settings labeled "Printed Color Control" 81 and "Halftoning" 90. These options can be selected on an object-by-object 41-43 basis; the object types in this case are text 85, graphics 86 and photos—or photo-like images—87.

TABLE 1

LIGHTNESS SLIDER settings and functions

| Color Control | γ value for indicated slider setting | | | | |
|---|---|---|---|---|---|
| | lightest | lighter | normal | darker | darkest |
| Accurate Math | 0.5 | 0.7 | 1.0 | 1.2 | 1.4 |
| Clear and Vibrant | 0.5 | 0.7 | 1.0 | 1.2 | 1.4 |
| No Adjustment | 0.3 | 0.4 | 0.6 | 0.8 | 1.0 |

In other words, the Printed Color Control 81 can be set for text 85 to a mode that is different from the mode or modes selected for graphics 86 and for photographic images or the like 87. The Halftoning method 90 too can be different for the three different types of objects 85-87.

The second category 96, 97 contains the "Lightness" slider 96 and the "Lookup-Table Colors" (e.g., "Pantone Colors") mode control 97. In the preferred embodiment these options can be set only on a job-by-job basis. This means that the Lightness 96 and Lookup-Table mode 97 act upon the entire job regardless of what types of objects are in each job (or on each page of the job).

The driver adjusts the incoming red, green and blue (RGB) data by applying a "gamma" (contrast function) correction to produce adjusted RGB data as indicated in Table 1.

In configuring the preferred embodiment, the color transfer functions of both the DJ 1200C and the PJ XL300 were characterized to create a lookup (e.g., Pantone® Color) table to be incorporated into the driver. When this mode is selected, the driver checks all incoming RGB values against the key values provided by the lookup table. If there is an exact match, then the driver maps (i.e., translates) the incoming RGB value into the correct (as discerned by Pantone) RGB value to send to the printer—to produce the closest approximation of the Pantone color selected.

Only so-called "Plain Paper" has been Pantone certified for the DJ 1200C; and "Special Paper" for the PJ XL300. In operating a system according to the preferred embodiment, if a user attempts to select the "Look-up-Table Colors" ("Pantone Colors") checkbox when the appropriate type 74/74' of medium is not selected, a warning message appears.

"Defaults" button 98 (FIG. 5)—This control resets all the user options in this dialog to the factory-default values for the prevailing mode. These defaults 85'/86'/87'/85"/86"/87" are shown in the "Manual Color Options Dialog" screen display 80 of FIG. 5.

"Calibrate Screen" button 99—This control brings up the so-called "Calibration" utility. An operator will use this when it is desired to recalibrate the monitor in order to assemble and store 14 new color maps (tables) for an "Accurate Screen Match" mode.

Tables 2 and 3 show the types of color matching (or "mapping" 82-84) and halftoning 21-27, 91, 92 (FIGS. 6 through 9) that are implemented in the driver 32 for the various user-selectable options or settings in this user-interface dialog 80. Following are definitions of the table entries.

"HMS type color map" 82 (FIG. 9)—This is a color-correction relationship used to boost the vibrancy of the hue associated with an input or given RGB value, as indicated by the designation "Vivid Color" in FIGS. 6 through 9.

"Accurate color map" 83—This is an alternative relationship created when a user calibrates the monitor with screen calibration 99 (that is, using the "Calibration" utility 14 mentioned above) in order to get printed output 57 that matches what is on the user's screen 45. This map 83 is then called up if the user actuates 81 (FIG. 6) the "Match Screen" selection 83 of FIG. 5.

"No Adjustment" 84—With this setting the driver 32 does not do any processing of incoming RGB data. This is

TABLE 2

PRINTED COLOR CONTROL/HALFTONING selections for TEXT and GRAPHICS

| Halftone setting | Color-Control setting | | | |
|---|---|---|---|---|
| | Clear and Vivid | Accurate Match | No Adjustment | key |
| Scatter | HMS color map (#1) | Accurate map (#8) | RGB pass-through | ← color "map" |
| | HPL noise | HPL noise | HPL Noise | ← half-toning |
| Cluster | HMS color map (#2) | Accurate map (#9) | RGB pass-through | ← color "map" |
| | Current Cluster dither | Current Cluster dither | Current Cluster dither | ← half-toning |
| Pattern | HMS color map (#3) | Accurate map (#10) | RGB pass-through | ← color "map" |
| | Current Bayer dither | Current Bayer dither | Current Bayer dither | ← half-toning | the mode an operator may use to control exactly the RGB values that are sent to the printer 56.

"HPL Noise with CV" 21 (FIGS. 6, 7 and 9)—This "Halftoning" 90 option utilizes a 128×128-byte so-called "Noise dither" matrix 27, along with conversion 25 of RGB data into "Color Vector" ("CV") data. This option provides quality closer to that of "Error Diffusion" (see below), with about the speed of normal dithering 91, 92.

This option is invoked in the "Fast" 68 or "Normal" 67 printing mode when "Scatter" halftoning is selected. "HPL Noise" halftoning 93 is disclosed in the above-mentioned copending applications Ser. Nos. 57,244 and 60,285; and "HPL Noise with CV" 21 is disclosed in the above-mentioned applications identified as Attorney Dockets 1094173-1 and 1094230-1, filed concurrently with this document.

TABLE 3

PRINTED COLOR CONTROL/HALFTONING selections for PHOTOGRAPHIC images

| Halftone setting | Color-Control setting | | | |
|---|---|---|---|---|
| | Clear and Vivid | Accurate Match | No Adjustment | key |
| Scatter | HMS color map (#4, 5) | Accurate map (#8, 11) | RGB pass-through | ← color "map" |
| | HPL noise with CV or CMYK Err. Diff. | HPL noise with CV or CMYK Err. Diff. | HPL noise with CV or CMYK Err. Diff. | ← half-toning |
| Cluster | HMS color map (#6) | Accurate map (#9) | RGB pass-through | ← color "map" |
| | Current Cluster dither | Current Cluster dither | Current Cluster dither | ← half-toning |
| Pattern | HMS color map (#7) | Accurate map (#10) | RGB pass-through | ← color "map" |
| | Current Bayer dither | Current Bayer dither | Current Bayer dither | ← half-toning |

"CMYK Err Diff" 22—This "Halftoning" option utilizes a CMYK (cyan-magenta-yellow-black) "Error Diffusion" algorithm. This provides the highest-quality output (for photograph-like images only), but is the slowest halftoning method.

It is used when the system is set to its "High Quality" printing mode 66 and "Scatter" halftoning 93 is selected. CMYK Error Diffusion 22 is disclosed in the above-mentioned application identified as Attorney Docket 1094210-1, filed concurrently with this document.

"Current Cluster dither"—This is the same "Cluster dither" 91 that is in earlier DJ 1200C and PJ XL300 printers —i.e., those without the present invention. This method is faster than Error Diffusion 22 and provides good edge definition for text and graphics.

"Current Bayer dither"—This is the same so-called "Pattern dither" 92 that is in earlier DJ 1200C and PJ XL300 printers—again, those uninfluenced by the present invention. This method has the same speed as Cluster dither 91 and has been preferred by some users.

There are two possible implementations of "Scatter for Photos" 93, both already introduced above. One is the "HPL Noise with CV" dither 21—sometimes called simply "CV Noise" or "Special Dither". In the preferred embodiment this is the default, since it is fast and gives better output quality (when compared to cluster or pattern) for raster images. The other implementation is "CMYK Error Diffusion" 22, which as previously noted provides even better quality but with a significant degradation in speed.

The selection between the two is based on the user-interface Print Quality 65 mode setting. The High Quality 66 setting automatically selects CMYK Error Diffusion 22, whereas each of the Fast 68 and Normal 68 settings selects CV Noise 21.

The total number of color-correction lookup tables or "maps" needed is also represented in Tables 2 and 3. Eleven maps are needed for all the combinations of color-matching modes and halftoning methods. This is a significant increase in the number of maps provided as part of a color-printer driver, relative to the prior art.

Figure 9:
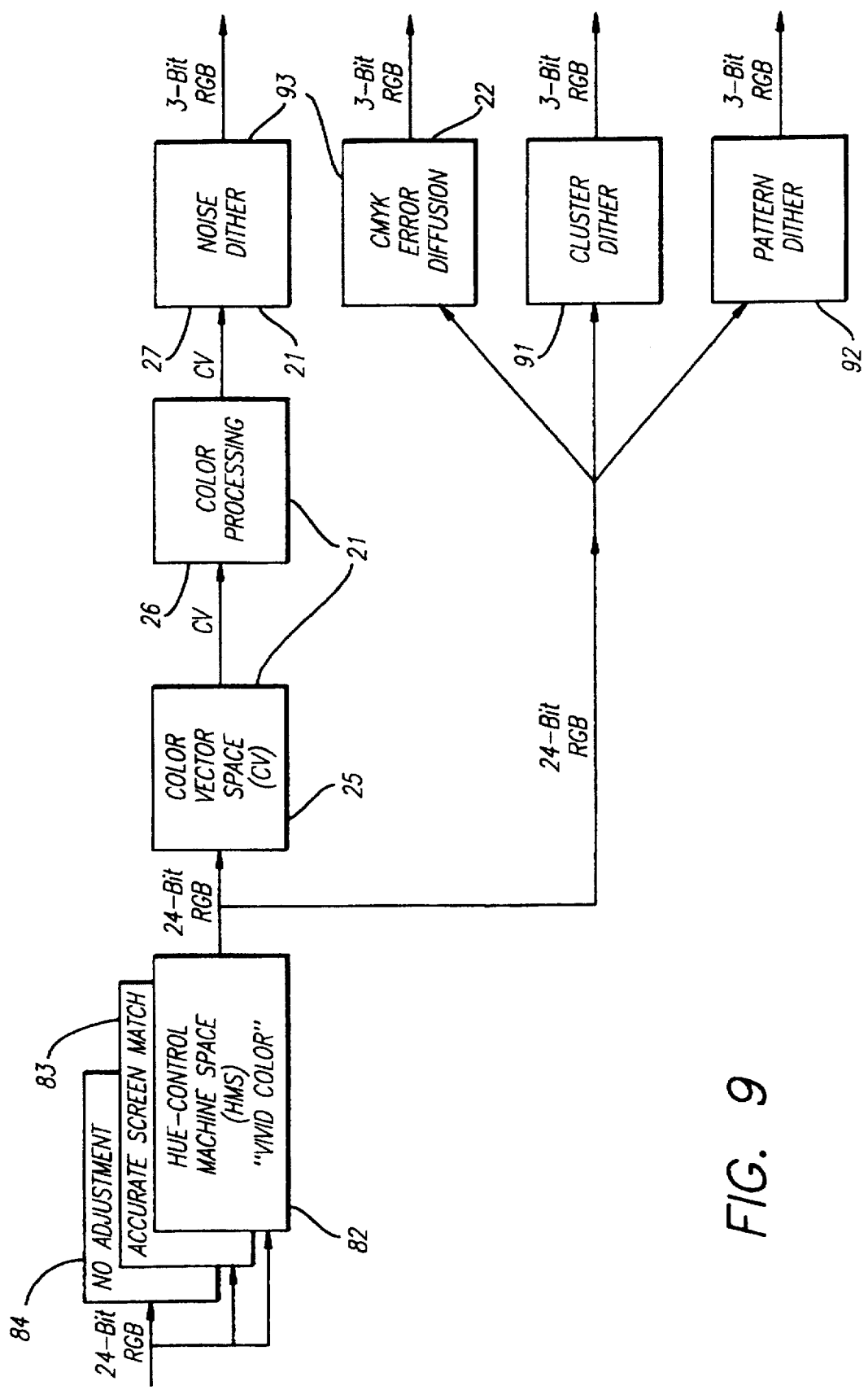
FIG. 9 is a functional block diagram showing the relationship of color control and halftoning in processing and printing photographic images.
Figure 10:
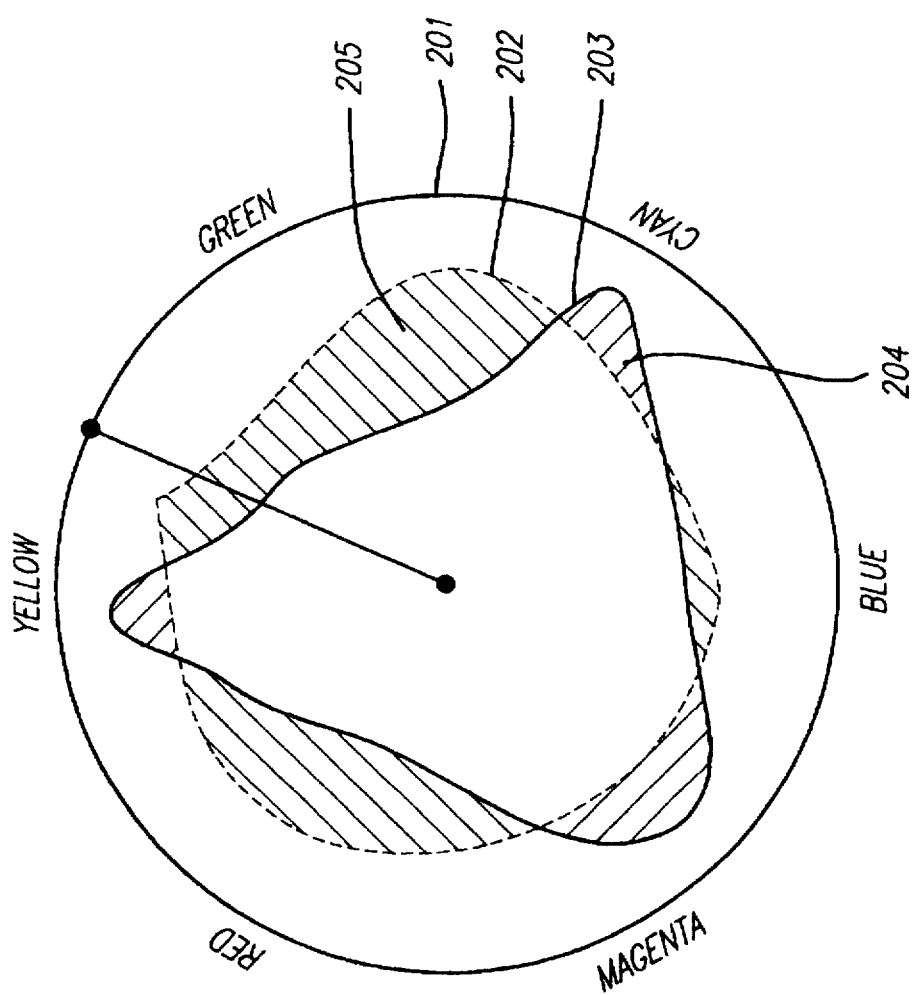
FIG. 10 is a schematic diagram showing the different color gamuts of visible light, a computer screen, and a printer which are used in the color control flow chart of FIG. 8.

As FIG. 9 shows, the input to the entire system is twenty-four-bit RGB, and the output is three-bit RGB sent to the printer. The steps involved are: choosing one of the color maps (HMS/Vivid, Accurate, or none) and mapping the color to another twenty-four-bit RGB value—and then going on to halftoning methods.

In the case of Noise Dither 21, preambles to halftoning are conversion 25 of the second twenty-four-bit RGB values to CV space, and some color processing 26 in CV space; then the halftoning 27 is done in CV space. For Cluster 91, Pattern 92 and Error Diffusion 22, the preferred embodiment performs the halftoning in RGB space.

TABLE 4

Assignment of rendition functions for object types

| Type | | Rendering location | |
|---|---|---|---|
| All Text | | Printer | |
| All Graphics Objects | | | |
| 1-, 4-, and 8-bit photo-like images | Cluster or Pattern Halftoning | | |
| | Scatter Half-Toning | Noise Err. Diff. | Windows Driver Normal/Fast High Quality |
| All 24-bit photo-like images | | | |

The color-matching portion of the color path is always done in the driver 32. The CV processing and halftoning 21–27, 91–93 are done either in the driver 32 or in the printer 56, depending on the type 41–43 of object being rendered.

Table 4 shows where objects of different types are rendered. All objects that are not already rendered in the application 31 (which is to say, most objects) are either rendered in the Windows driver or in the printer 56 firmware.

For objects that are to be rendered in the printer 56, color processing is first done in the driver 32—this encompasses the Color Matching 81, Lightness slider 96, and Lookup-Table (Pantone) Colors 97 settings. Then the object is sent from the Windows driver to the printer with associated twenty-four-bit final RGB values.

Based on the user's halftoning selections 90 in the user interface 80—or on the automatic halftoning invocations 187"/93 etc. based on the user's mode selections 65–68—a command is also sent to the printer 56 to set the appropriate rendering mode 21/22/91/92 in the printer. The printer firmware 56 is then responsible for rendering all the objects and, in some cases, for scaling raster images.

As Table 4 indicates, the only objects that are rendered in the Windows driver are photograph-like images that use the Scatter halftoning 93, and all 24-bit photo-like images. The reason the Scatter halftoning 93 is rendered in the driver is that not all printers support the Scatter mode 93; and the only way to support both Error Diffusion 22 and Noise dither 21 on all printers is to provide them in the driver.

The twenty-four-bit images are rendered in the driver regardless of the halftoning mode in order to minimize the amount of data sent over the printer interface. Each twenty-four-bit RGB pixel is ordinarily halftoned down to three bits per pixel, which inherently provides an eight-to-one compression—in addition to the printer-command-line compression on those three-bit pixels.

It will thus be appreciated from the foregoing description that many improvements are provided by the present invention. In the past users have only had limited control in the selection of rendering options and color-correction options. That is, they have been limited to choosing one particular rendering option and/or one particular color-correction option for an entire document.

With the present invention, on one hand it is now possible for a sophisticated user to select an independent rendering option and independent color-correction option for each type of object (e.g., text, business graphics, and photographic images). For example, in the printer-driver dialog screens shown in the drawings, a user can select a Scatter 93 halftone for photographic images, a Pattern 92 halftone for business graphics, and a Cluster 91 halftone for text.

In addition, color-correction options can be chosen for each object type independently of the halftoning method. This independent control of halftoning and color correction for each object gives the sophisticated user a multitude of options and thus very fine control of the quality and appearance of the printed output.

On the other hand, for hurried or unsophisticated users—or those preparing material in which color quality is not crucial—the invention introduces the ability to render and color-correct objects based on their respective types, with defaults and a minimum of decision-making (e.g., selection of "Fast" 68 and "Automatic Color" 62). Hence it is possible to preselect halftoning and color-correction options that are normally the best for each object type 41-43.

Thus the invention provides an automatic default that produces the best quality output for most users of a particular printer—but also optional manual settings that can be changed by the more-demanding user.

Furthermore, as set forth earlier another printout quality feature is preferably automatically implemented as a default in the printer system. For example, in conceiving the preferred embodiment it was determined that users prefer a particular error-diffusion halftoning 22 over other kinds of dither halftoning.

This selection has been incorporated into (or, as phrased just above, automatically implemented as a default in) the print-quality print-mode options of the sort used by many manufacturers. Such print-mode options allow users to choose settings such as to optimize the printer technology itself for either faster output or higher-quality output.

It was discovered that this option could also be used to control an analogous kind of tradeoff within the printer driver itself, and in particular solved the problem of selecting—with a minimum of human-user decisions and entry operations—a halftoning method to use for certain complex objects such as photographic images. Thus, if the user chooses a print quality setting of "high quality" 66, the driver will perform CMYK error diffusion 22 to render all raster images (e.g., photograph-like images), while settings of "Normal" 67 or "Fast" 68 for the print mode will cause the driver 32 to perform noise dithering 21 on all raster images.

While various examples and embodiments of the invention have been shown and described, it will be appreciated by those skilled in the art that the spirit and scope of the invention are not limited to the specific description and drawings herein, but extend to various modifications and changes all as set forth in the following claims.

We claim as our invention:

1. A method of color inkjet printing for use in printing color objects of any of a plurality of different object types; said method comprising the following steps:

providing means for identification and recognition of a plurality of different types of color objects;

providing means for using a plurality of different color-rendering options in printing color objects;

automatically providing default settings for at least one of said color-rendering options;

identifying the type of at least one color object in a document to be printed;

selecting a preferred color-rendering option to be used for objects of said identified type; and using a printer system to cause a color inkjet printer to use the preferred color-rendering option of said selecting step to print said at least one color object, of said identified type, in said document.

2. The method of claim 1, wherein:

said selecting step includes selecting a halftoning color-rendering option to be used for said identified color-object type.

3. The method of claim 1, wherein:

said selecting step includes selecting a color-matching option to be used for said at least one type of color object.

4. The method of claim 1, wherein:

said identifying step includes identifying the types of color objects which are of at least two different types, in a document to be printed; and said selecting step includes selecting a preferred color-rendering option to be used for each of said at least two different types of color object.

5. The method of claim 1, wherein:

said identifying step includes identifying the types of color objects which are of at least three different types, in a document to be printed; and said selecting step includes selecting a preferred color-rendering option to be used for each of said at least three different color-object types.

6. The method of claim 1, wherein:

said identifying step and said selecting step are both accomplished automatically by the printer system recited in said using step.

7. A method of color inkjet printing for use in printing color objects of any of a plurality of different object types; said method comprising the following steps:

providing means for identification and recognition of a plurality of different types of color objects;

providing means for using a plurality of different color-rendering options in printing color objects;

identifying the type of at least one color object in a document to be printed;

selecting a preferred color-rendering option to be used for objects of said identified type; and using a printer system to cause a color inkjet printer to use the preferred color-rendering option of said selecting step to print said at least one color object, of said identified type, in said document;

wherein said selecting step includes selecting both a halftoning color-rendering option and a color-matching option to be used for said identified color-object type.

8. A method of using a color inkjet printer for printing a composite document having therein color objects of different color-object types; said method including the steps of:

providing a color inkjet printer;

identifying the type of at least one color object;

using a predetermined first rendering option to print, using said color inkjet printer, all color objects of said one color-object type of said identifying step; and employing a predetermined second rendering option to print, using said color inkjet printer, color objects of remaining types, different from said one color-object type.

9. A method of printing a composite document having therein color objects of different color-object types; said method including the steps of:

identifying the type of at least one color object;

using a predetermined first rendering option to print all color objects of said one color-object type of said identifying step; and employing a predetermined second rendering option to print color objects of remaining types, different from said one color-object type wherein:

said identifying step includes identifying all raster-data commands as photo image color objects.

10. The method of claim 9, wherein:

said selecting step includes selecting a preferred halftone color-rendering option to be used for photo image color objects.

11. The method of claim 10, wherein:

said selecting step includes selecting a preferred color-matching color-rendering option to be used for photo image color objects.

12. A method of printing a composite document having therein color objects of different color-object types; said method including the steps of:

identifying the type of at least one color object;

using a predetermined first rendering option to print all color objects of said one color-object type of said identifying step; and employing a predetermined second rendering option to print color objects of remaining types, different from said one color-object type; wherein:

said identifying step includes identifying all text commands as text objects.

13. The method of claim 12, wherein:

said identifying step includes identifying all commands which are not text or raster-data commands as business graphics color objects.

14. A system of printing color documents in a raster printer comprising:

a printer for applying color to media;

a document source for providing specifications for a composite color document having nontext color objects; and a printer system connected through a printer driver to said document source, said printer system including color-management means for providing print-rendering options which are selectively enabled for said nontext color objects; wherein:

said printer is a color inkjet printer.

15. A system of printing color documents in a raster printer comprising:

a printer for applying color to media;

a document source for providing specifications for a composite color document having nontext color objects; and a printer system connected through a printer driver to said document source, said printer system including color-management means for providing print-rendering options which are selectively enabled for said nontext color objects; wherein:

said color-management means automatically provide default setting for at least one of said print-rendering options.

16. The system of claim 15, wherein:

said color-management means provides halftone print-rendering options which can be enabled for said nontext color objects.

17. The system of claim 15, wherein:

said color-management means provides halftone print-rendering options which can be separately enabled for two different types of nontext color objects.

18. The system of claim 15, wherein:

said color-management means provides color-matching print-rendering options which can be separately enabled for two different types of nontext color objects.

19. The system of claim 16, wherein:

said color-management means comprise a graphical computer interface having dialog boxes for use by a person in selectively enabling said print-rendering options.

* * * * *